US011954438B2

(12) United States Patent
Sandridge et al.

(10) Patent No.: US 11,954,438 B2
(45) Date of Patent: Apr. 9, 2024

(54) DIGITAL CONTENT VERNACULAR ANALYSIS

(71) Applicant: International Business Machines Corporation, Armonk, NY (US)

(72) Inventors: Thomas Jefferson Sandridge, Tampa, FL (US); Dasson Tan, Honolulu, HI (US); Emma Alexandra Vert, Potomac, MD (US); Matthew Digman, Winchester, VA (US); Jessica L. Zhao, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/347,987

(22) Filed: Jun. 15, 2021

(65) Prior Publication Data

US 2022/0398381 A1 Dec. 15, 2022

(51) Int. Cl.

*G06F 40/295* (2020.01)
*G06F 40/242* (2020.01)
*G06F 40/284* (2020.01)
*G06F 40/30* (2020.01)

(52) U.S. Cl.

CPC .......... *G06F 40/295* (2020.01); *G06F 40/242* (2020.01); *G06F 40/284* (2020.01); *G06F 40/30* (2020.01)

(58) Field of Classification Search

CPC .... G06F 40/295; G06F 40/242; G06F 40/284; G06F 40/30; G06N 20/00
See application file for complete search history.

(56) References Cited

U.S. PATENT DOCUMENTS

| | | | |
|---|---|---|---|
| 8,037,147 | B1 | 10/2011 | Herold et al. |
| 9,043,196 | B1 | 5/2015 | Leydon et al. |
| 9,213,687 | B2 | 12/2015 | Au |
| 9,705,832 | B2 | 7/2017 | Waltermann et al. |
| 10,133,732 | B2 | 11/2018 | Mungi et al. |

(Continued)

OTHER PUBLICATIONS

Dhuliawala, Shehzaad, et al. "Slangnet: A wordnet like resource for english slang." Proceedings of the Tenth International Conference on Language Resources and Evaluation (LREC'16). 2016, pp. 4329-4332 (Year: 2016).*

(Continued)

*Primary Examiner* — Jesse S Pullias
*Assistant Examiner* — Michael C. Lee
(74) *Attorney, Agent, or Firm* — Michael O'Keefe

(57) ABSTRACT

Disclosed embodiments provide techniques to identify the in-context meanings of natural language in order to decipher the evolution or creation of new vocabulary words and create a more holistic user experience. Thus, disclosed embodiments improve the technical field of digital content comprehension. In embodiments, machine learning is used to identify sentiment of text, perform entity detection to determine topics of text, and/or perform image analysis on images used in digital content. Words, symbols, and images that are determined to be potentially unfamiliar to a user are augmented with a supplemental definition indication. Invoking the supplemental definition indication enables rendering of additional definition information for the user. This serves to accelerate understanding of digital content such as webpages and social media posts.

18 Claims, 17 Drawing Sheets

(56) References Cited

U.S. PATENT DOCUMENTS

| | | | | |
|---|---|---|---|---|
| 10,347,248 | B2 | 7/2019 | Kennewick et al. | |
| 10,368,211 | B2 | 7/2019 | Bouzid et al. | |
| 10,546,015 | B2 | 1/2020 | Dimson et al. | |
| 10,592,605 | B2 | 3/2020 | Ajmera et al. | |
| 2010/0023476 | A1* | 1/2010 | Cannon | G06F 40/242 707/E17.009 |
| 2011/0087956 | A1* | 4/2011 | Sherman | G06F 40/169 715/233 |
| 2015/0310002 | A1* | 10/2015 | Yu | G06F 40/30 707/750 |
| 2017/0270925 | A1 | 9/2017 | Kennewick et al. | |
| 2017/0344224 | A1 | 11/2017 | Kay et al. | |
| 2018/0276198 | A1 | 9/2018 | Mungi et al. | |
| 2021/0019674 | A1* | 1/2021 | Crabtree | G06V 30/274 |
| 2021/0406270 | A1* | 12/2021 | Meling | G06F 16/24578 |
| 2022/0165178 | A1* | 5/2022 | Göçülü | G06F 3/04842 |
| 2022/0337540 | A1* | 10/2022 | Bayer | G06F 3/04886 |

OTHER PUBLICATIONS

Merriam-Webster.com API Documentation, available at https://web.archive.org/web/20210508225721/https://www.dictionaryapi.com/products/json (archived on May 8, 2021) (Year: 2021).*

Lau et al., "Enabling Context Aware Services in the Area of AAC", Jan. 2011, 24 pages.

LSRI, "Education in the wild: contextual and location-based mobile learning in action", University of Nottingham, Copyright 2010, 56 pages.

Su et al., "How Time Matters: Learning Time-Decay Attention for Contextual Spoken Language Understanding in Dialogues", Apr. 14, 2018, 10 pages.

IPCOM000256564D, "Method and System for Performing Cognitive Multiscale Analysis and Characterization of Lithological and Petrophysical Patterns", Dec. 11, 2018, 6 pages.

IPCOM000253441D, "Disambiguation of entity references in natural language interpretation", Mar. 29, 2018, 7 pages.

IPCOM000251058d, "Method and system for interactive word-sense disambiguation", Oct. 6, 2017, 6 pages.

* cited by examiner

```
<!DOCTYPE html>
<html>
<body style="text-align:center;">
    1354
<p>Fun League Baseball Scoring Report:</p>
<p>The Bats Were On Fire</p>
<p>Casey Smith hit two doubles and three home runs last night for the win!</p>
</body>
</html>
```

1300

1352

1320

1322

1324

1327

```
<!DOCTYPE html>
<html>
<style>
.tooltip {
  position: relative;
  display: inline-block;
  border-bottom: 1px dotted black;
}

.tooltip .tooltiptext {
  visibility: hidden;
  width: 120px;
  background-color: black;
  color: #fff;
  text-align: center;
  border-radius: 6px;
  padding: 5px 0;

  /* Position the tooltip */
  position: absolute;
  z-index: 1;
}

.tooltip:hover .tooltiptext {
  visibility: visible;
}
</style>
<body style="text-align:center;">

<p>Fun League Baseball Scoring Report:</p>

<div class="tooltip">The Bats Were On Fire
  <span class="tooltiptext">Likely Definition: A
stick used to hit a baseball</span>
</div>

<p>Casey Smith hit two doubles and three home runs
last night for the win!</p>

</body>
</html>
```

FIG. 14B

DIGITAL CONTENT VERNACULAR ANALYSIS

FIELD

Disclosed embodiments relate generally to machine learning, and more particularly, to computerized digital content vernacular analysis.

BACKGROUND

The Internet has created the possibility to share content in an efficient and cost-effective manner. The result of this is that more content and more sources of content are available for a user to consume. The digital content can include text, images, video data, audio data, and/or other forms of content. People from various geographic regions and social groups can consume each other's digital content via personal electronic computing devices such as computers, smartphones, tablet computers, and the like. This increased sharing of digital content allows for new sources of entertainment, education, news, advertising, and revenue generation. It is therefore desirable to have improvements in the dissemination of digital content.

SUMMARY

In one embodiment, there is provided a computer-implemented method, comprising: identifying a familiarity category corresponding to a user; performing a computerized natural language processing process on digital content presented to the user to identify a topic of the digital content; computing a content unfamiliarity index for the digital content based on the topic and the familiarity category of the user; comparing the content unfamiliarity index to a predetermined threshold; determining, based on the comparing, that the content unfamiliarity index exceeds the predetermined threshold; and in response to the determining, generating a supplemental definition indication for the digital content.

In another embodiment, there is provided an electronic computation device comprising: a processor; a memory coupled to the processor, the memory containing instructions, that when executed by the processor, cause the electronic computation device to: identify a familiarity category corresponding to a user; perform a computerized natural language processing process on digital content presented to the user to identify a topic of the digital content; compute a content unfamiliarity index for the digital content based on the topic and the familiarity category of the user; compare the content unfamiliarity index to a predetermined threshold; determine, based on the comparing, that the content unfamiliarity index exceeds the predetermined threshold; and in response to the determining, generate a supplemental definition indication for the digital content.

In another embodiment, there is provided a computer program product for an electronic computation device comprising a computer readable storage medium having program instructions embodied therewith, the program instructions executable by a processor to cause the electronic computation device to: identify a familiarity category corresponding to a user; perform a computerized natural language processing process on digital content presented to the user to identify a topic of the digital content; compute a content unfamiliarity index for the digital content based on the topic and the familiarity category of the user; compare the content unfamiliarity index to a predetermined threshold; determine, based on the comparing, that the content unfamiliarity index exceeds the predetermined threshold; and in response to the determining, generate a supplemental definition indication for the digital content.

BRIEF DESCRIPTION OF THE DRAWINGS

FIG. 14B shows an exemplary modified HTML code snip based on the code snip of FIG. 14A, in accordance with embodiments of the present invention.

Figure 1:
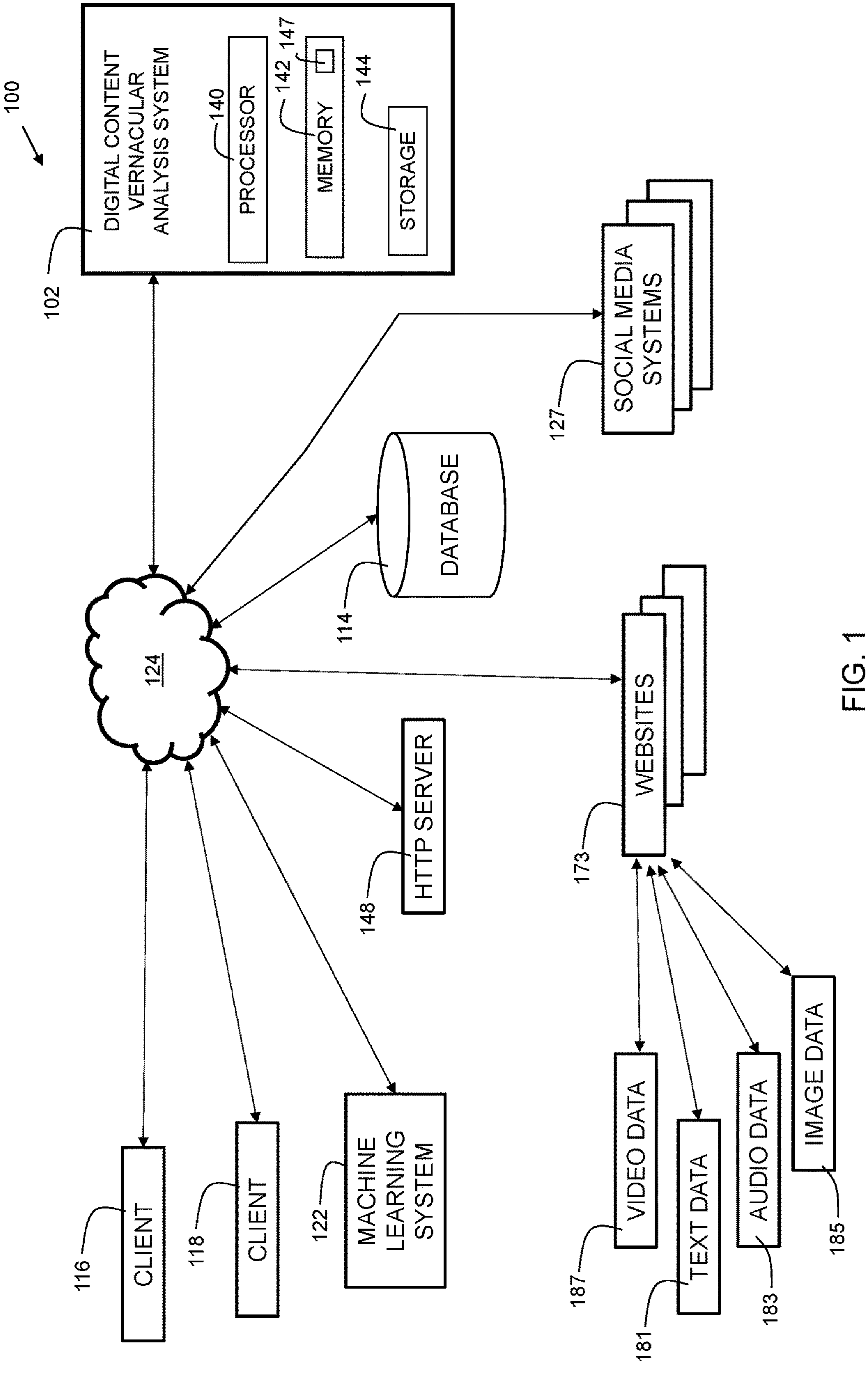
FIG. 1 is a block diagram of an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for vernacular analysis of digital content. The connectivity provided by the Internet has accelerated the spread of new words, terms, memes, emojis, images, and other symbols. Thus, a wide range of "communities" can now communicate with each other with ease. These communities can correspond to geographic regions such as states, provinces, and countries. These communities can correspond to groups. The groups can be social groups. The groups can be organized within a social media system around a particular interest, such as sports, music, technology, science, art, and others.

In many cases, a user belonging to a first group may encounter digital content from a second group, of which he is not a part of, and thus, may not be familiar with various words, terms, and/or symbols used within digital content of the second group. Disclosed embodiments identify and/or infer a group for the user and identify that the digital content is from a group, or pertains to a subject, that is outside of the groups (or interests) of the user. Disclosed embodiments then identify tokens (words, phrases, symbols, and/or images) that may be unfamiliar and/or have a meaning different from the first group in the context of the second group. These identified tokens are then associated with a supplemental definition indication. The user can then select the supplemental definition indication via mouseover, click, tap, or other suitable gesture in order to invoke supplemental definition information for the token. This can assist unfamiliar users with interpretation of digital content. The digital content can include text, images, symbols, audio, video, and/or other data types.

Disclosed embodiments can identify non-words as they are introduced into digital content. Over time, as more instances of a non-word is identified, disclosed embodiments classify the non-word as a slang word. The introduction of the non-word can be identified. The meaning of the non-word can be inferred using computerized natural language processing. The meaning of the non-word can change over time. Disclosed embodiments can generate a non-word audit record. The non-word audit record can be provided to a user via a report. The non-word audit record contains information regarding the origins of a non-word, as well as current meaning of the non-word. This information can be valuable to linguists, advertisers, marketers, and others interested in tracking the origin and evolution of language.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a block diagram of an environment 100 for embodiments of the present invention. At 102, there is a digital content vernacular analysis system (DCVAS). System 102 is an electronic computation device. System 102 includes a processor 140, memory 142, and storage 144. Memory 142 comprises instructions 147, which when executed by the processor, cause system to implement embodiments of the invention. System 102 is in communication with network 124. Network 124 may be the internet, a wide area network, a local area network, a cloud network, or other suitable network.

Social media systems 127 are also connected to network 124. Social media systems are systems where users can typically set up account profiles for themselves and connect with other user's account profiles. The systems allow users to post text, images, videos, and other content, as well as send private messages between users and groups. The groups can be focused on a particular interest such as sports, art, food, and the like. The groups can be focused on a particular occupation, such as accounting, engineering, plumbing, etc. Thus, in embodiments, a user's association with a group can be used to infer his/her familiarity with a given topic. Examples of such social media systems include Facebook®, Instagram®, LinkedIn®, Reddit®, etc.

Database 114 is connected to network 124. Database 114 stores information used by client devices 116 and 118. This information can include user profiles and associated user records. The associated user records can include user profile information, demographics information, posts, purchase histories, records of likes and dislikes for social media content, and/or other information that can be used to infer a level of familiarity with a given topic.

Websites 173 are connected to network 124. Websites 173 can include news sites, entertainment sites, and/or ecommerce sites where users can purchase various items or services from the ecommerce system. Each of the websites contains one or more pieces of digital content that can include text data 181, audio data 183, image data 185, video data 187, and/or other suitable data.

Also connected to network 124 is machine learning system 122. This system uses machine learning and artificial intelligence to perform natural language processing (NLP) on digital content such as website text, social media posts and/or other online activities performed by a user. The machine learning system 122 may further perform classification and/or identification of image data 185, audio data 183, and/or video data 187 using supervised and/or unsupervised learning techniques, neural networks, Bayesian filters, Tensor Flow, and/or other suitable machine learning processes and/or constructs. In some embodiments, audio data 183 may be converted to text data via speech-to-text processing, and then the converted text data may be analyzed via NLP processing to perform functions in accordance with embodiments of the present invention.

Client devices 116 and 118 are shown connected to network 124. These computing devices are used by users to communicate with the digital content vernacular analysis system 102 and other items on the network. Client devices 116 and 118 may be laptop computers, desktop computers, smartphones, tablets, or other suitable devices. In practice, there may be more or fewer client devices than the two shown in FIG. 1.

HTTP (Hypertext Transfer Protocol) server 148 may be used by digital content vernacular analysis system 102 in order to provide digital content that is annotated with one or more supplemental definition indications to simplify understanding of digital content. In some embodiments, the digital content vernacular analysis system 102 may scrape content from one or more websites 173, modify HTML (Hypertext Markup Language) code associated with the websites, and serve the modified HTML code via HTTP server 148. A client device (such as 116) can then retrieve content from HTTP server 148 via a web browser operating on the client device. In some embodiments, a plugin on the client device browser may be installed to seamlessly retrieve information from HTTP server 148 and use it to supplement information on websites 173. In this way, users can view unfamiliar digital content and quickly access supplemental definition information in order to reduce the time needed to comprehend the content, thus reducing the "learning curve" in many situations.

Figure 2:
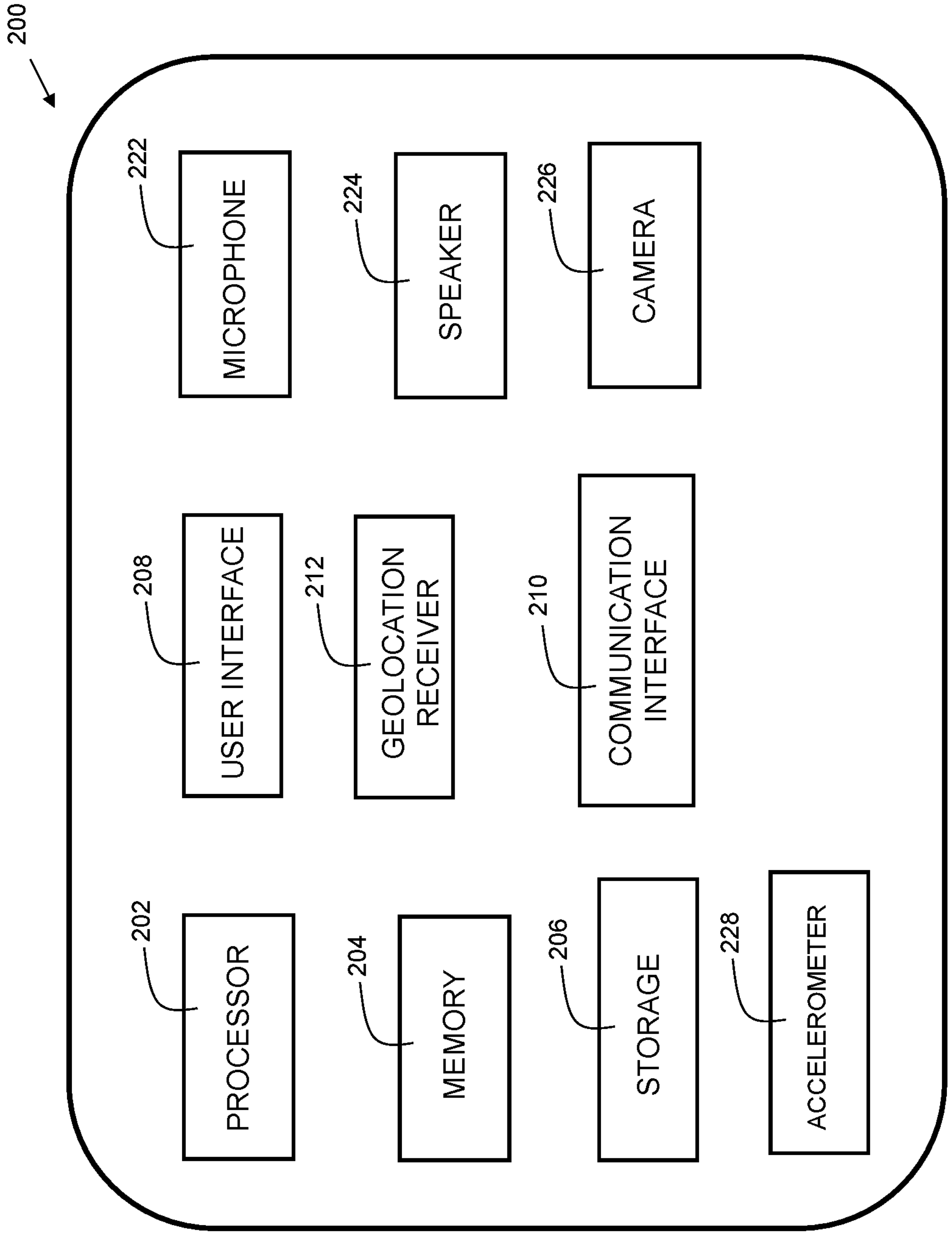
FIG. 2 is a block diagram of a client device used in accordance with embodiments of the present invention.

FIG. 2 is a block diagram of an electronic device used in accordance with embodiments of the present invention that may act as a client device such as client devices 116 or 118 of FIG. 1. Device 200 can be a smartphone, tablet computer, or other computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se.

Device 200 may further include storage 206. In embodiments, storage 206 may include one or more magnetic storage devices such as hard disk drives (HDDs). Storage 206 may additionally include one or more solid state drives (SSDs).

Device 200 further includes user interface 208. This may be a display, such as an LED display, a touch-sensitive screen, a keyboard, a mouse, or any other suitable interface for a user to interact with device 200.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 may further include geolocation system 212. In embodiments, geolocation system 212 includes a Global Positioning System (GPS), GLONASS, Galileo, or other suitable satellite navigation system.

Device 200 may further include a microphone 222 used for receiving speech utterances, and/or other sounds. Device 200 may further include a speaker 224 used for outputting audio data, such as speech, music, and/or other sounds. Device 200 may further include a camera 226 for acquiring still and/or video images. Device 200 may further include an accelerometer 228 for tracking motion and/or orientation of device 200.

Figure 3A:
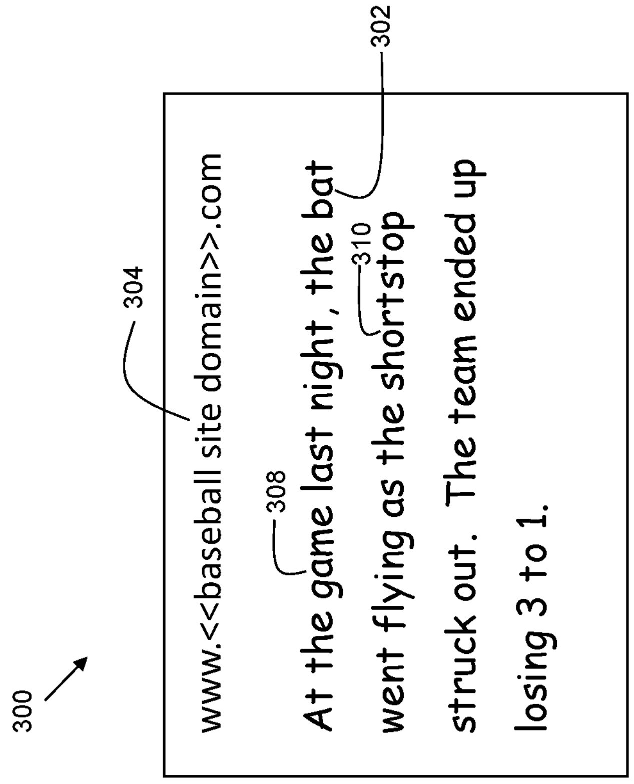
FIG. 3A shows an example of digital content in accordance with embodiments of the present invention.

FIG. 3A shows an example of digital content 300 in accordance with embodiments of the present invention. Digital content 300 includes a source domain 304. In embodiments, names of popular domains, and associated topics may be stored in database 114. In the example of FIG. 3A, domain 304 is known as associated with a website pertaining to baseball. Additionally, words such as bat 302, game 308, and shortstop 310 are all words that can be related to baseball. The machine learning system 122 may use one or more of these words and/or the domain as inputs to determine that the subject matter of the digital content 300 pertains to baseball.

Figure 3B:
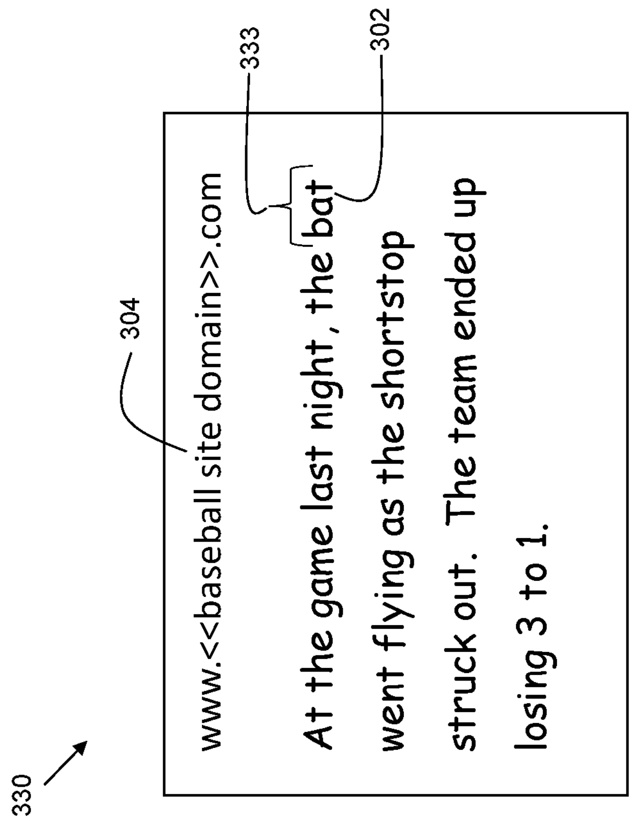
FIG. 3B shows an example of digital content with a supplemental definition indication for the digital content in accordance with embodiments of the present invention.

FIG. 3B shows an example of digital content 330 with a supplemental definition indication for digital content 330 in accordance with embodiments of the present invention. In the example of FIG. 3B, disclosed embodiments identify that a user viewing the digital content 330 may be unfamiliar with baseball. Disclosed embodiments identify the word bat 302 as a word with multiple definitions. In embodiments, database 114 may contain one or more lists and/or dictionaries that indicate words that have multiple meanings, and thus, may be prone to cause confusion to an unfamiliar reader. A supplemental definition indication 333 is shown above the word bat 302. In embodiments, the supplemental definition indication 333 may be encoded in HTML. In embodiments, a user can select (via mouseover, click, tap, or other suitable action) the supplemental definition indication 333 in order to display one or more definitions.

Figure 3C:
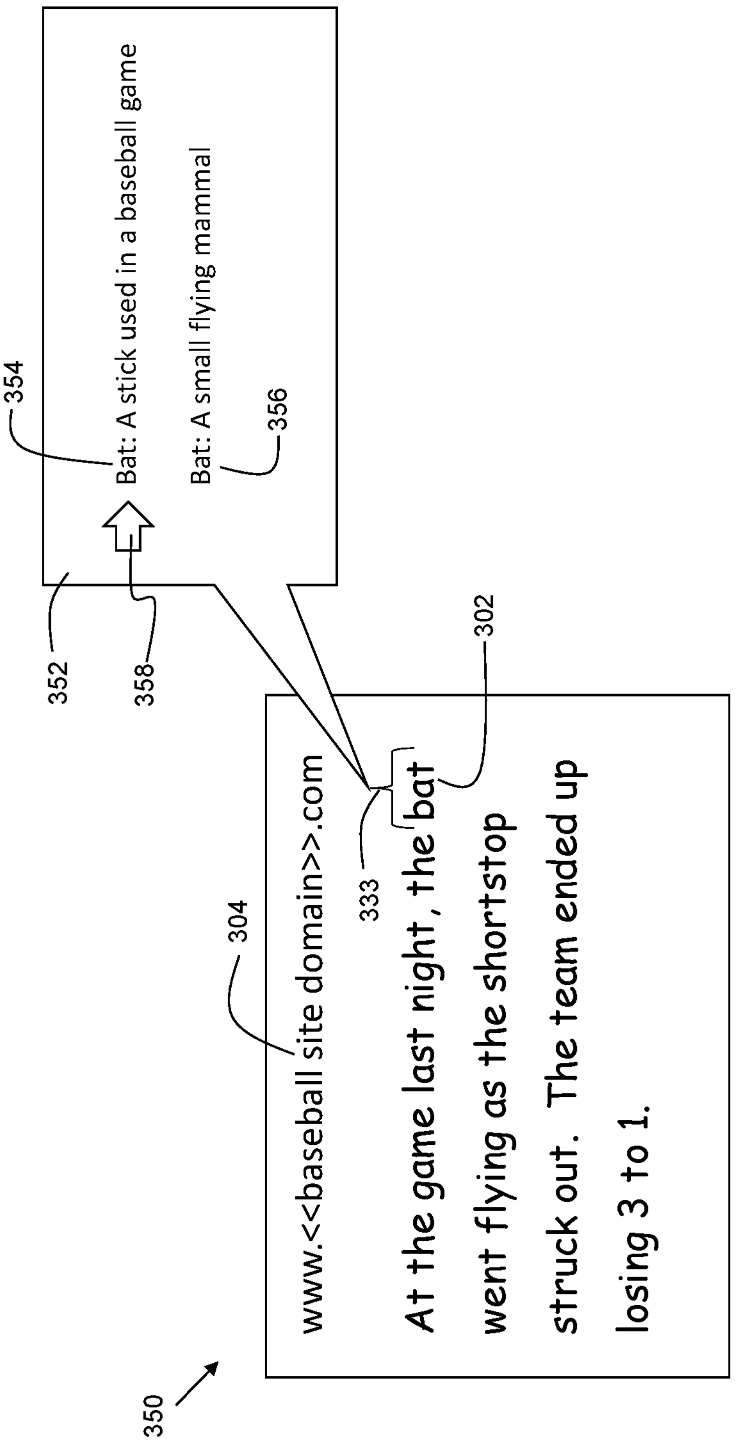
FIG. 3C shows an example of supplemental definitions for the digital content in accordance with embodiments of the present invention.

FIG. 3C shows an example of supplemental definitions for digital content 350 in accordance with embodiments of the present invention. The word bat 302 in the digital content 350 has a supplemental definition indication 333 associated with it. When the user selects the supplemental definition indication 333 via mouseover, click, tap, voice activation, or other suitable action, a supplemental definition field 352 is rendered. In embodiments, a supplemental definition field is used to display one or more definitions for a word, image, and/or symbol(s). In some embodiments, multiple definitions may be displayed within a supplemental definition field. In some embodiments, when more than one possible definition exists, the most likely meaning, based on computerized analysis of the digital content, is indicated. The supplemental definition field 352 can display one or more definitions for the word 302. In the example of FIG. 3C, a first definition is shown at 354, and a second definition is shown at 356. In embodiments, a likely definition may be indicated with a likely definition indicator 358. The indication can be based on context derived from natural language processing of the digital content, source of the digital content (e.g., domain 304), or other suitable techniques. In this example, since the DCVAS 102 performs a domain search within database 114 to determine that the domain 304 is associated with baseball. The word "bat" is indicated as having a baseball-specific definition in database 114, and the DCVAS 102 associates likely definition indicator 358 with the definition shown at 354, to indicate that definition as the likely definition in the context of baseball. This allows a user unfamiliar with baseball terminology to quickly and conveniently learn the meaning of the word "bat" in the context of baseball.

The example shown in FIGS. 3A-3C illustrates identification of a word that may be unfamiliar to a given user. However, embodiments may also provide a similar feature for non-words. Non-words can include combinations of letters that are not part of an official corpus of words such as the Oxford English Dictionary. These combinations of letters are sometimes referred to as slang words. Over time, some slang words can become part of the commonly used lexicon. The word "blog" is such an example. Non-words can include jargon that is specific to a certain field, such as the word "shortstop" pertaining to the field of baseball. The non-words can include alphanumeric sequences, sometimes referred to as "leet." Examples of such leet non-words can include BE4ST as a leet non-word representing the word "beast." The non-words can include images such as GIFs, JPEGs, or other formats. The non-words can include symbols such as emojis, or sequences of multiple symbols, such as compound emojis, where a compound emoji is comprised of a consecutive sequence of emojis. Disclosed embodiments can provide supplemental definition indications and/or etymology data for words and/or any of the aforementioned types of non-words.

Figure 4B:
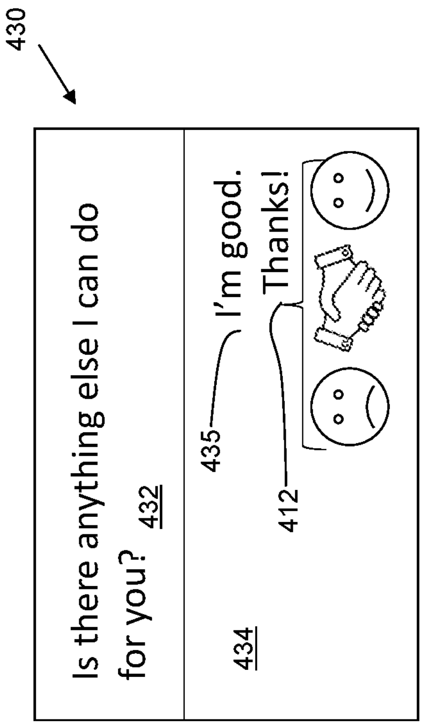
FIG. 4B shows a second example of a compound emoji used with associated text in accordance with embodiments of the present invention.
Figure 4A:
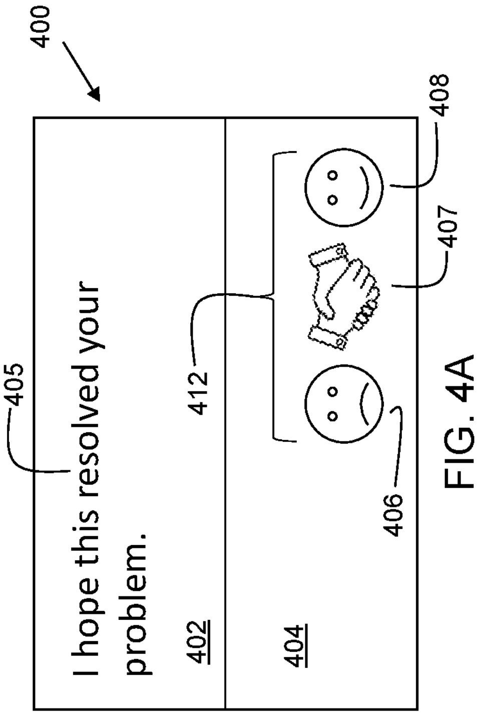
FIG. 4A shows a first example of a compound emoji used in isolation in accordance with embodiments of the present invention.

FIG. 4A shows a first example of a compound emoji used in isolation within an instant message sequence 400 in accordance with embodiments of the present invention. An instant message (IM) sequence comprises a written dialog, sometimes referred to as a chat, IM, or IM chat. The written dialog can be between two or more parties. The written dialog can include text, images, video, audio, and/or symbols. Communication from a first party is shown in field 402. Communication from a second party is shown in field 404, which temporally comes after the communication shown in field 402. In this example, the communication in field 404 is given in response to the communication shown in field 402.

The communication in field 404 comprises a compound emoji 412. The compound emoji is comprised of multiple emojis in a sequence. In the example of FIG. 4A, the compound emoji 412 is comprised of three emojis: a "sad face" emoji 406, followed by a "handshake" emoji 407, followed by a "happy face" emoji 408. The meaning of compound emojis such as that shown at 412 can be very difficult for unfamiliar users to interpret. Disclosed embodiments use natural language processing to derive possible meanings for compound emojis. The DCVAS 102 may apply natural language processing to the preceding communication in field 402. In this example, the word "resolved" 405 may be identified, and a meaning pertaining to resolution may be inferred by the DCVAS 102 with use of machine learning system 122. As more examples of usage of the compound emoji are processed by the DCVAS 102, the intended definition of the compound emoji becomes more refined and accurate.

FIG. 4B shows a second example of a compound emoji used with associated text in accordance with embodiments of the present invention. Message sequence 430 shows communication from a first party in field 432. Communication from a second party is shown in field 434, which temporally comes after the communication shown in field 432. In this example, the communication in field 434 is given in response to the communication shown in field 432. In this example, the second party communication in field 434 includes both a text phrase at 435, and the compound emoji 412. In this example, the DCVAS 102 may apply natural language processing to the phrase 435 in field 434 that is included along with the compound emoji 412. The DCVAS 102 may further refine the meaning of the compound emoji 412 based on a computerized sentiment analysis of the phrase at 435. The phrase "I'm good. Thanks!" may be deemed to have positive sentiment (positive polarity), which is used to then associate the compound emoji 412 with a positive sentiment. This process can repeat thousands, or even millions of times with communications from thousands, or even millions of different users to perform a training process on machine learning system 122. Once trained, the DCVAS 102 then can access the machine learning system 122 to obtain a likely meaning for the compound emoji 412. As likely meanings for compound emojis are identified, the Unicode sequence corresponding to the compound emoji, along with the meaning(s) derived by machine learning system 122 may be stored in database 114 for fast retrieval by DCVAS 102, thereby reducing the time required to render a supplemental definition indication. This is important in real-time communication such as instant messaging, as any delays in providing supplemental definition indications can hinder understanding between two communicating parties.

Figure 4C:
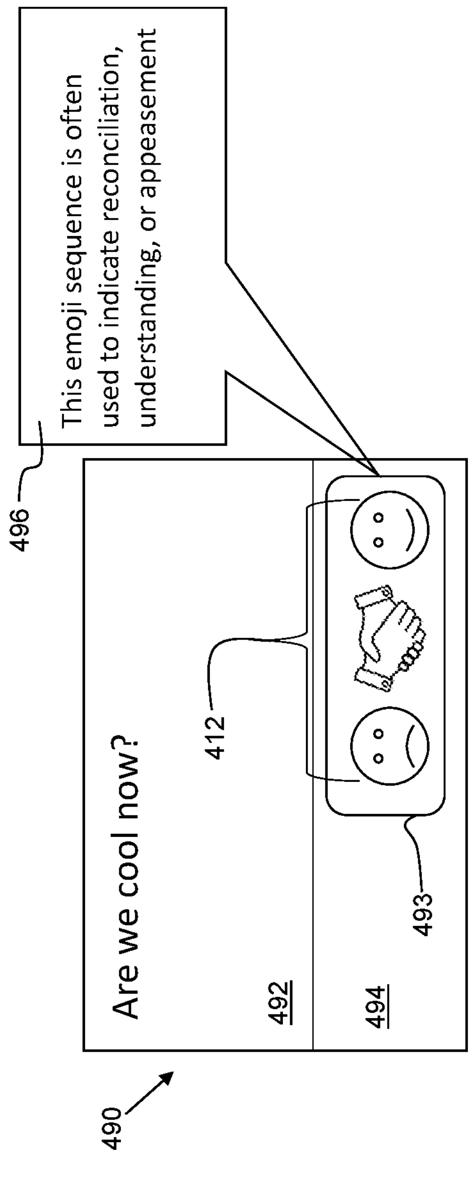
FIG. 4C shows an example of a supplemental definition indication associated with a compound emoji in accordance with embodiments of the present invention.

FIG. 4C shows an example of a supplemental definition indication associated with a compound emoji in accordance with embodiments of the present invention. Message sequence 490 shows communication from a first party in field 492. Communication from a second party is shown in field 494, which temporally comes after the communication shown in field 492. In this example, the communication in field 494 is given in response to the communication shown in field 492. The communication in field 494 includes compound emoji 412 without any accompanying text. The DCVAS 102 has an available meaning for the given emoji sequence and renders a supplemental definition indication 493. In this example, the first party user, not being familiar with that emoji sequence, can select the supplemental definition indication 493 (via tap, click, mouseover, or other suitable technique) to cause the generation of the supplemental definition field 496, which indicates a likely meaning for the compound emoji 412.

In some embodiments, users may opt-in to allow the DCVAS 102 to perform analysis of instant message communication, social media posts, e-mails, and/or other communication. In such embodiments, only after a user opts in, does the DCVAS 102 perform such analysis. In some embodiments, the instant message communication may be anonymized, with user-identifying data such as user names being removed, to help maintain privacy of users. This enables a crowdsourced technique for deriving definitions of various words and non-words. In some embodiments, in exchange for opting in, users are given access to supplemental definition indications to enable them to better understand digital content from outside of their sphere of knowledge.

Figure 5A:
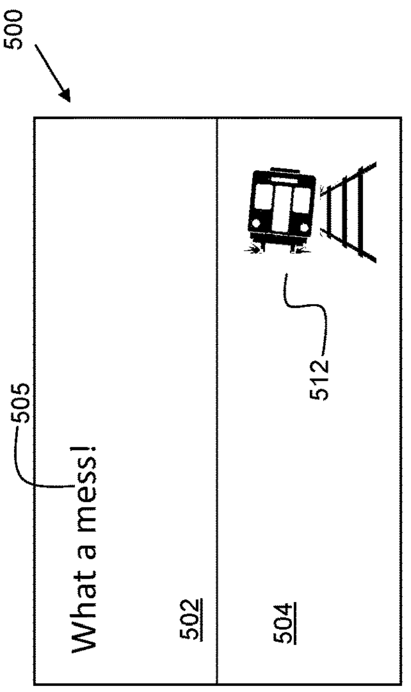
FIG. 5A shows a first example of an image used in isolation in accordance with embodiments of the present invention.

FIG. 5A shows a first example of an image used in isolation within an instant message sequence 500 in accordance with embodiments of the present invention. Communication from a first party is shown in field 502. Communication from a second party is shown in field 504, which temporally comes after the communication shown in field 502. In this example, the communication in field 504 is given in response to the communication shown in field 502.

The communication in field 504 comprises an image 512. The image can be a bitmap, JPEG, GIF, or other suitable format. In the example of FIG. 5A, the image 512 is of a train flipped on its side. The meaning of images such as that shown at 512 can be very difficult for unfamiliar users to interpret. Disclosed embodiments use natural language processing combined with computerized image classification to derive possible meanings for images used in written communication such as instant messaging, e-mail, and/or social media posting. The DCVAS 102 may apply natural language processing to the preceding communication in field 502. In this example, the word "mess" 505 may be identified, and a meaning pertaining to negative sentiment may be inferred by the DCVAS 102 with use of machine learning system 122. The image 512 may be identified as a train accident. As more examples of usage of the image classification are processed by the DCVAS 102, the intended definition of the compound emoji becomes more refined and accurate.

Figure 5B:
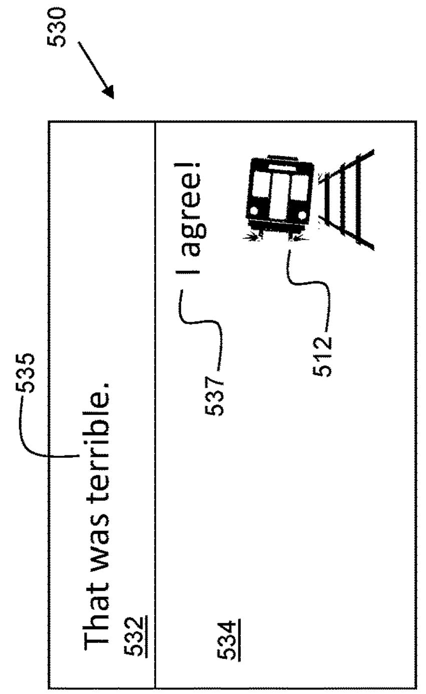
FIG. 5B shows a second example of an image used with associated text in accordance with embodiments of the present invention.

FIG. 5B shows a second example of an image used with associated text in accordance with embodiments of the present invention. Message sequence 530 shows communication from a first party in field 532. Communication from a second party is shown in field 534, which temporally comes after the communication shown in field 532. In this example, the communication in field 534 is given in response to the communication shown in field 532. In this example, the second party communication in field 534 includes both a text phrase at 537, and the train accident image 512. In this example, the DCVAS 102 may apply natural language processing to the phrase 537 in field 534 that is included along with the image 512. The DCVAS 102 may further refine the meaning of the image 512 based on a computerized sentiment analysis of the phrase at 537. The phrase "I agree!" may be deemed to have reinforced sentiment detected from previous communication field 532, which contains the word "terrible" 535. This can be used to associate the image 512 with a negative sentiment. This process can repeat thousands, or even millions of times with communications from thousands, or even millions of different users to perform a training process on machine learning system 122. Once trained, the DCVAS 102 then can access the machine learning system 122 to obtain a likely meaning for the image 512 and/or image classification (e.g., train accident). As likely meanings for images are identified, the classification of the image, along with the meaning(s) derived by machine learning system 122 may be stored in database 114 for fast retrieval by DCVAS 102, thereby reducing the time required to render a supplemental definition indication. This is important in real-time communication such as instant messaging, as any delays in providing supplemental definition indications can hinder understanding between two communicating parties.

Figure 5C:
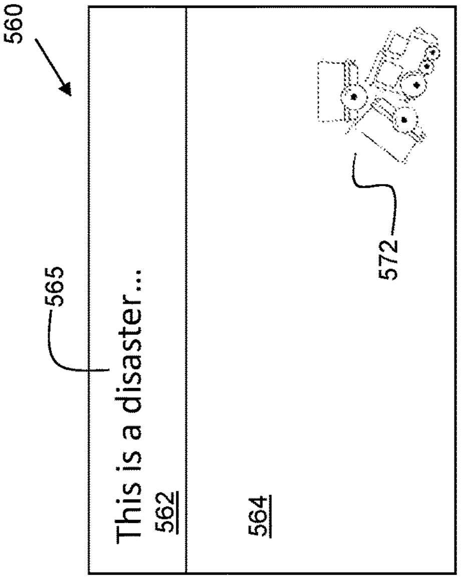
FIG. 5C shows a third example of an image used in isolation in accordance with embodiments of the present invention.

FIG. 5C shows a third example of an image used in isolation in accordance with embodiments of the present invention. Message sequence 560 shows communication from a first party in field 562. Communication from a second party is shown in field 564, which temporally comes after the communication shown in field 562. In this example, the communication in field 564 is given in response to the communication shown in field 562. In this example, the second party communication in field 564 includes a train accident image 572. Train accident image 572 is not identical to train accident image 512 of FIG. 5A. In embodiments, the DCVAS 102 provides the image 572 to machine learning system 122 for image classification. The machine learning system 122 can classify image 572 as a train accident. The DCVAS 102 may further perform natural language processing on text in field 562. The text in field 562 includes the word "disaster" 565, which may be identified as having negative sentiment. The image classification of "train accident" is then associated with the negative sentiment. Thus, even though image 572 is different from image 512, both images are of the same image classification (train accident) and thus, treated similarly with regards to digital content vernacular analysis.

Figure 5D:
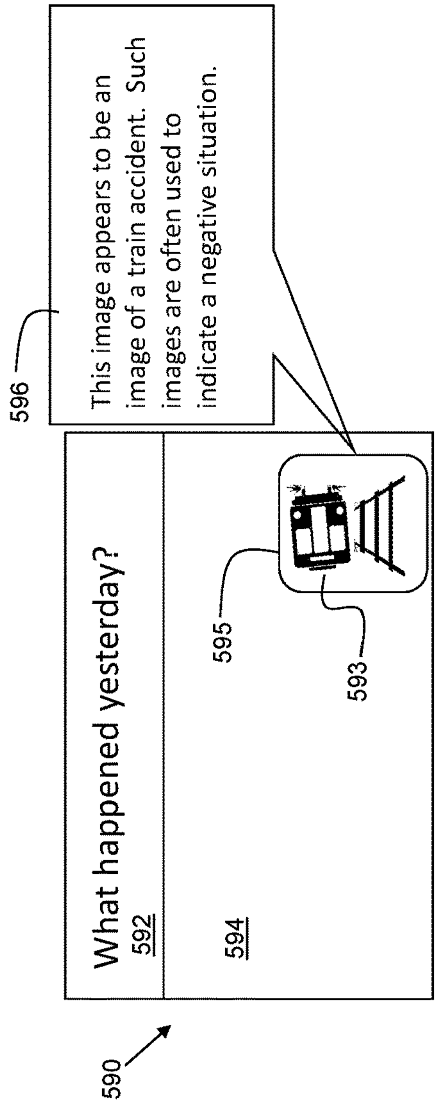
FIG. 5D shows an example of a supplemental definition indication associated with an image in accordance with embodiments of the present invention.

FIG. 5D shows an example of a supplemental definition indication associated with an image in accordance with embodiments of the present invention. Message sequence 590 shows communication from a first party in field 592. Communication from a second party is shown in field 594, which temporally comes after the communication shown in field 592. In this example, the communication in field 594 is given in response to the communication shown in field 592. The communication in field 594 includes an image 593 without any accompanying text. Image 593 may not be identical to previously encountered images used in training machine learning system 122. However, once machine learning system 122 is trained, the image 593 can be identified as an image of a train accident. The DCVAS 102 has an available meaning for an image of a classification type of "train accident" based on analysis of previous communication sequences and renders a supplemental definition indication 595. In this example, the first party user, not being familiar with the intended meaning of image 593 in this context, can select the supplemental definition indication 595 (via tap, click, mouseover, or other suitable technique) to cause the generation of the supplemental definition field 596, which indicates a likely meaning for the image 593.

Figure 6A:
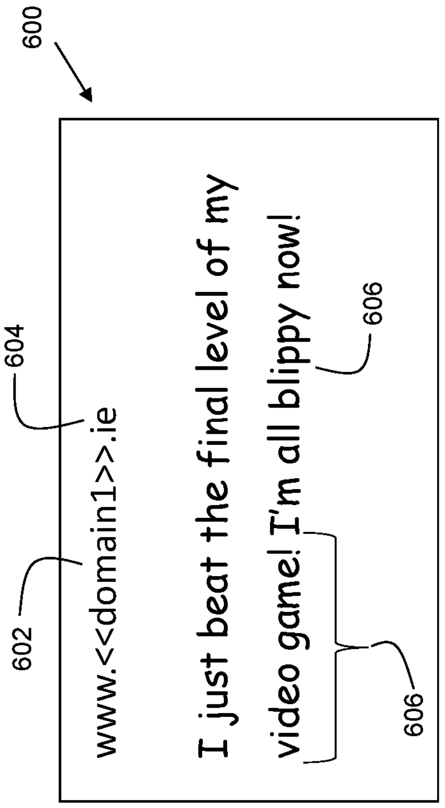
FIG. 6A shows a first example of usage of a non-word.

FIG. 6A shows a first example of usage of a non-word. Digital content 600 includes text that comprises a non-word "blippy" at 606. The digital content 600 may be posted on a website that includes a domain name 602, and a domain suffix 604. The domain name 602 can be used in embodiments to identify a group or topic to which the digital content 600 pertains. As an example, if the domain at 602 is for a known video game website, then the digital content 600 may be interpreted as pertaining to video games. The suffix 604 may infer a geographical region in some cases. In this example, the suffix of "ie" indicates Ireland. The DCVAS 102 may perform natural language processing on the text and identify the phrase "video game" 606, to further confirm the subject matter of video games, and that the term "blippy" may be used in a video game community indicating happiness.

Figure 6B:
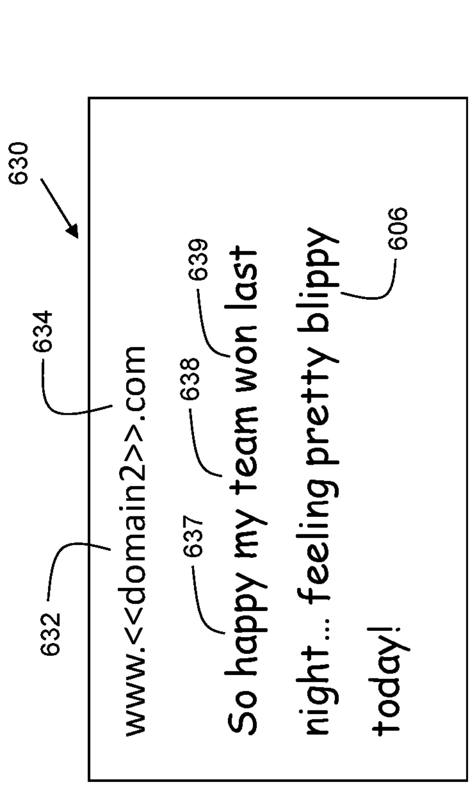
FIG. 6B shows a second example of usage of a non-word.

FIG. 6B shows a second example of usage of a non-word. Digital content 630 includes text that comprises a non-word "blippy" at 606. The digital content 630 may be posted on a website that includes a domain name 632, and a domain suffix 634. The domain name 632 can be used in embodiments to identify a group, or topic to which the digital content 630 pertains. As an example, if the domain at 632 is for a known sports website, then the digital content 630 may be interpreted as pertaining to sports. The suffix 634 may infer a geographical region in some cases. In this example, the suffix of "corn" is typically used in the United States. The DCVAS 102 may perform natural language processing on the text and identify the word "happy" at 637 and infer sentiment. The DCVAS 102 may perform natural language processing on the text and identify the word "team" at 638 and "won" at 639 and infer a topic of sports, and that the term "blippy" may also be used in a sports community indicating happiness.

Figure 6C:
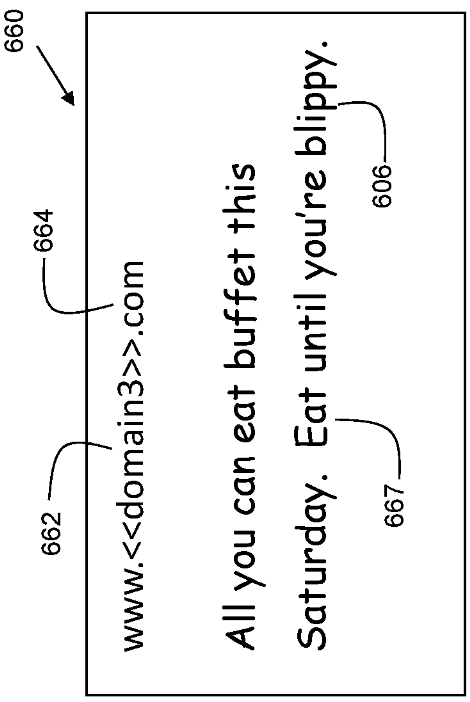
FIG. 6C shows a third example of usage of a non-word.

FIG. 6C shows a third example of usage of a non-word. Digital content 660 includes text that comprises a non-word "blippy" at 606. The digital content 660 may be posted on a website that includes a domain name 662, and a domain suffix 664. The domain name 662 can be used in embodiments to identify a group, or topic to which the digital content 660 pertains. As an example, if the domain at 662 is for a restaurant, then the digital content 660 may be interpreted as pertaining to a restaurant. The suffix 664 may infer a geographical region in some cases. In this example, the suffix of "corn" is typically used in the United States. The DCVAS 102 may perform natural language processing on the text and identify the word "eat" at 667 and infer context pertaining to eating, and that the term "blippy" may also be used in a restaurant context indicating satisfaction.

Figure 6D:
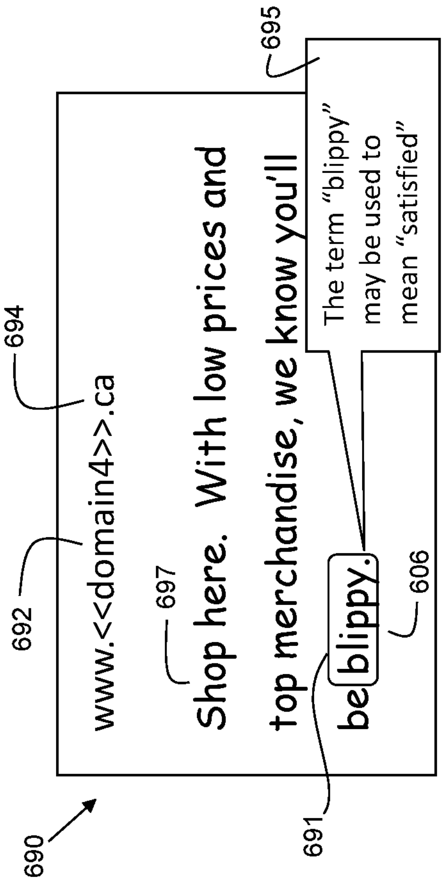
FIG. 6D shows a fourth example of usage of a non-word.

FIG. 6D shows a fourth example of usage of a non-word. Digital content 690 includes text that comprises a non-word "blippy" at 606. The digital content 690 may be posted on a website that includes a domain name 692, and a domain suffix 694. The domain name 692 can be used in embodiments to identify a group, or topic to which the digital content 690 pertains. As an example, if the domain at 692 is for a retail store, then the digital content 690 may be interpreted as pertaining to shopping. The suffix 694 may infer a geographical region in some cases. In this example, the suffix of "ca" is typically used in Canada. The DCVAS 102 may perform natural language processing on the text and identify the word "shop" at 697 and infer context pertaining to shopping, and that the term "blippy" may also be used in a shopping context indicating satisfaction.

After sufficient training, the DCVAS 102 has an available meaning for the non-word "blippy" based on analysis of previous analysis of other digital content samples and renders a supplemental definition indication 691. In this example, a user, not being familiar with the intended meaning of the term "blippy" at 606 in this context, can select the supplemental definition indication 691 (via tap, click, mouseover, or other suitable technique) to cause the generation of the supplemental definition field 695, which indicates a likely meaning for the non-word at 606.

In embodiments, identifying a familiarity category comprises performing an entity detection process on a post associated with the user. The DCVAS 102 may utilize a variety of metadata associated with the post. The metadata can include a date, a user name, a geographical region, a social media group name, a social media group type, an operating system type, an operating system version, and/or other available metadata. In embodiments, the metadata includes an internet domain name.

Figure 7:
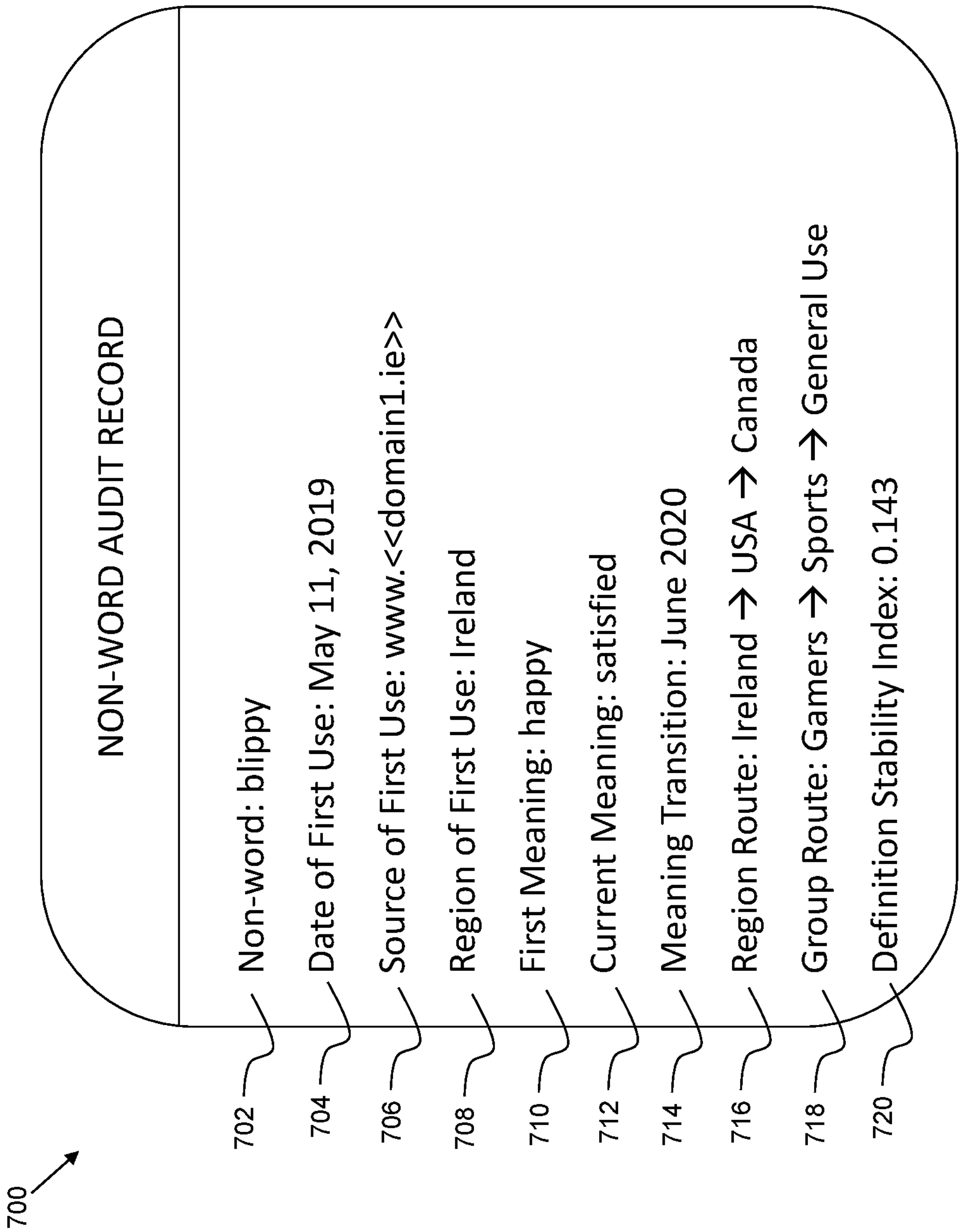
FIG. 7 shows an example of a non-word audit record in accordance with embodiments of the present invention.

FIG. 7 shows an example of a non-word audit record 700 in accordance with embodiments of the present invention. The non-word audit record provides etymology data for the non-word. The non-word audit record 700 pertains to the example illustrated in FIGS. 6A-6D. Over time, the DCVAS 102 collects statistics on non-words, and tracks the usage, and change in meanings over time.

At 702, a name for the non-word is shown. At 704, a date for first use of the non-word is shown. In embodiments, this may be the date that the DCVAS 102 first encountered the non-word. Upon first encounter, it may not be known if the occurrence of the non-word ("blippy") is simply a misspelling, or a purposeful attempt to convey a meaning. Over time, if a predetermined number of additional instances of the non-word are encountered, the DCVAS 102 classifies the word as a slang word.

At field 706, a source of first use is shown. In the example of FIG. 7, this is the domain indicated in FIG. 6A. In addition to, or instead of, a domain, the source of first use can include a group name, and/or other suitable source. At 708, a geographical region is shown, if known. In this example, based on the domain suffix (604) associated with first use, the region of first use is indicated as Ireland.

At field 710, a first meaning is displayed. This meaning reflects the first meaning inferred using computerized natural language processing. Over time, the meaning of words can change. At field 712, a current meaning is displayed. This meaning reflects the current meaning inferred using computerized natural language processing. At 714, a meaning transition date is shown. This date indicates the date when the DCVAS 102 detected a change in meaning, based on computerized natural language processing and/or analysis of other associated metadata.

At 716, a region route is shown. This provides an indication of how, geographically, a term propagates. In the example shown in FIGS. 6A-6D, the term ("blippy") started in Ireland, then was being used in the United States, followed by Canada.

At 718, a group route is shown. This provides an indication of how, in terms of groups or communities, a term propagates. In the example shown in FIGS. 6A-6D, the term ("blippy") started with gamers (video game players), then was being used in the sports community, followed by general use. In embodiments, a non-word may be deemed to be in general use when it is found in at least a predetermined number of distinct groups. As an example, when a term is used in at least four groups, it may be deemed to be in general use.

At 720, a definition stability index is shown. This is a metric indicating how stable the current definition is. In embodiments, a lower value indicates a less stable current definition, and a higher value indicates a more stable current definition. In some embodiments, the definition stability index D can be computed as follows:

$$D=C/(T-C+K)$$

Where:

C=number of months with the non-word at the current definition;

T=total number of months of existence of the non-word; and

K=a predetermined constant.

In a first example where C=6, T=36, and K=12, this results in a definition stability index D of:

$$D=6(36-6+12)=0.143$$

In a second example where C=24, T=40, and K=12, this results in a definition stability index D of:

$$D=24(40-24+12)=0.857$$

Accordingly, the second example is indicative of a definition that has a higher definition stability index, and thus, is deemed less likely to change than that of the first example. This information can be useful for advertisers, marketers, and other researchers to determine the etymology of non-words. For example, advertisers may be more comfortable using a non-word with a higher definition stability index in an advertisement, since a change in meaning can adversely affect an advertising campaign that uses the non-word.

In embodiments, the non-word audit record further includes a definition history for the non-word. The definition history can include a list of meanings, in sequence from the first encountering of the non-word. In the example shown in FIGS. 6A-6D, the definition history includes the first meaning ("happy") and the second, and current meaning ("satisfied"). In practice, there can be multiple meanings in the definition history as the usage of a non-word changes over time. Embodiments can further include computing a definition stability index for the non-word based on the definition history.

Figure 8:
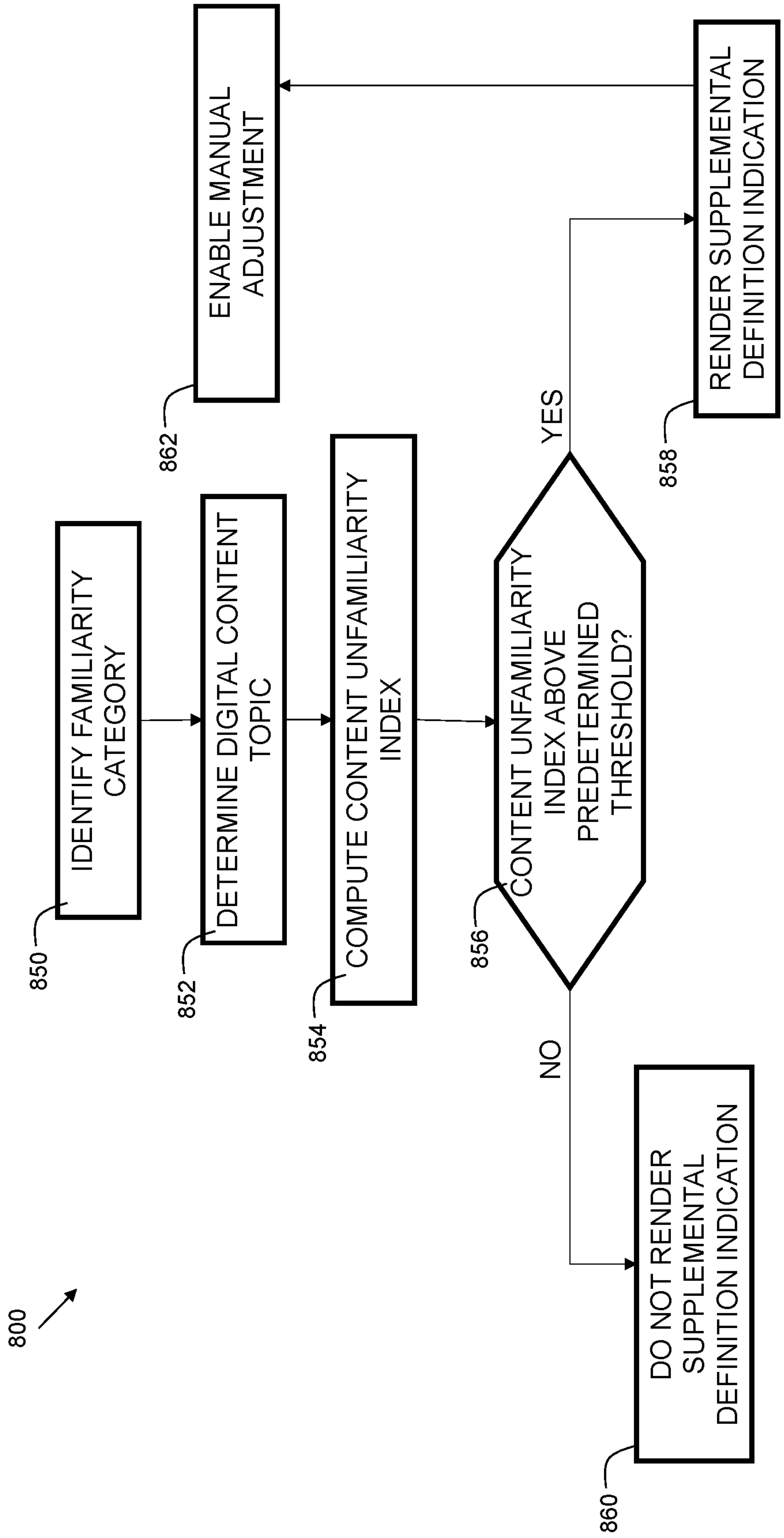
FIG. 8 is a flowchart indicating process steps for embodiments of the present invention.

FIG. 8 is a flowchart 800 indicating process steps for embodiments of the present invention. At 850, a familiarity category for a user is identified. In embodiments, the familiarity category for a user is identified by the DCVAS 102 parsing metadata associated with a user. The metadata can include a user profile in a social media system. The metadata can include the names of one or more groups within a social media system. The group or groups may be used to infer familiarity. As an example, a user belonging to a group "Impressionists" and another group "Surrealism" may be deemed as familiar with art.

At 852, a digital content topic is determined. In embodiments, the digital content topic is determined by the DCVAS 102 scraping text from a website, and performing natural language processing on the text, where the natural language processing includes entity detection, sentiment analysis, and/or disambiguation. The DCVAS 102 may further perform image analysis on any images within the digital content.

At 854, a content unfamiliarity index is computed. The content unfamiliarity index reflects a likely level of unfamiliarity of a user with the content that he/she is consuming (viewing, watching, listening to, etc.). In embodiments, the content unfamiliarity index may be computed as a mathematical distance between two entries in a topic array, where each entry in the array indicates a topic. As an example, one entry can indicate "art" while another entry can indicate "chemistry." A mathematical distance between columns within the array that contain two entries may be used as the content unfamiliarity index. At 856, a check is made to determine if the content unfamiliarity index exceeds a predetermined threshold. If yes, then a supplemental definition indication is rendered at 858. If no, then a supplemental definition indication is not rendered at 860. In this way, when a user is consuming digital content for which they have sufficient familiarity, he/she is not disturbed by supplemental definition indications for terms for which he/she is already familiar.

Optionally, at 862, subsequent to 858, a manual adjustment may be enabled. In some embodiments, a manual feedback option may be used. In these embodiments, a user can indicate to the DCVAS 102 whether the analysis accurately made the interpretation of the word or phrase more effective to the user. If not, then in some embodiments, some other definitions may be suggested that the user may have found more helpful for the user to choose from for future use. In some embodiments, the user may also manually overrule the suggested definition if the proposed definition is known to be incorrect.

Embodiments can include identifying a familiarity category corresponding to a user; performing a computerized entity detection process on digital content presented to the user to identify a digital content topic; computing a content unfamiliarity index for the digital content based on the topic and the familiarity category of the user; and in response to the content unfamiliarity index exceeding a predetermined threshold, rendering a supplemental definition indication for the digital content.

Figure 9:
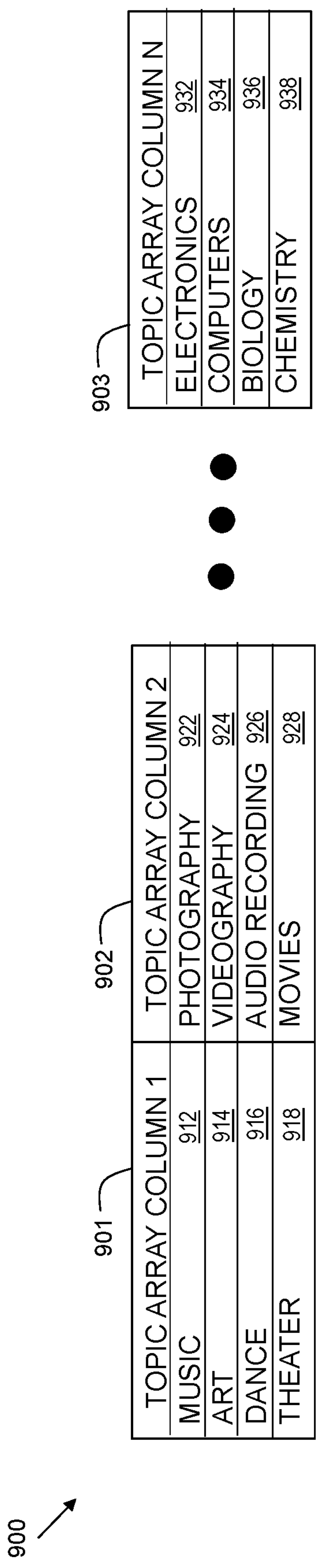
FIG. 9 is an example of a topic array in accordance with embodiments of the present invention.

FIG. 9 is an example of a topic array 900 in accordance with embodiments of the present invention. Topic array 900 includes a plurality of columns, indicated as 901, 902, and 903. While four entries are shown in each column, in practice, there can be more or fewer than four entries per column. Furthermore, in some embodiments, some columns may have a different number of entries than other columns with the topic array 900. As an example, in column 901, there are four entries indicated as music 912, art 914, dance 916, and theater 918. In column 902, there are four entries indicated as photography 922, videography 924, audio recording 926, and movies 928. In column 903, there are four entries indicated as electronics 932, computers 934, biology 936, and chemistry 938. If a user is deemed to have familiarity in art (located in column 901 at entry 914) and is reading digital content having a subject determined to be photography (located in column 902 at entry 922), then the distance between the columns is computed as the position of the second column minus the position of the first column, which is one, since the two columns are in adjacent positions. Thus, the content unfamiliarity index has a value of one in this example. The value of one may be below a predetermined threshold, which causes the DCVAS 102 to suppress supplemental definition indications. The practical result of this in the above example is that for a user familiar with art, they may also have some familiarity with photography and thus, not need supplemental definition indications.

Column 903 represents the Nth column of the array. In another example, if N is 150, and a user is deemed to have familiarity in art (located in column 901 at entry 914), and is reading digital content having a subject determined to be chemistry (located in column 903 at entry 938), then the distance between the columns is computed as the position of the Nth column minus the position of the first column, which is 149 in this example. Thus, the content unfamiliarity index has a value of 149 which may exceed a predetermined threshold (e.g., a threshold of 20), thereby causing the DCVAS 102 to generate supplemental definition indications. The practical result of this in the above example is that for a user familiar with art, they may be unfamiliar with chemistry and thus benefit from supplemental definition indications. In practice, there can be many hundreds of columns within topic array 900 to encompass a wide variety of topics. The use of the topic array of FIG. 9 pertains to some embodiments. Other embodiments may compute a content unfamiliarity index utilizing another suitable technique.

Figure 10:
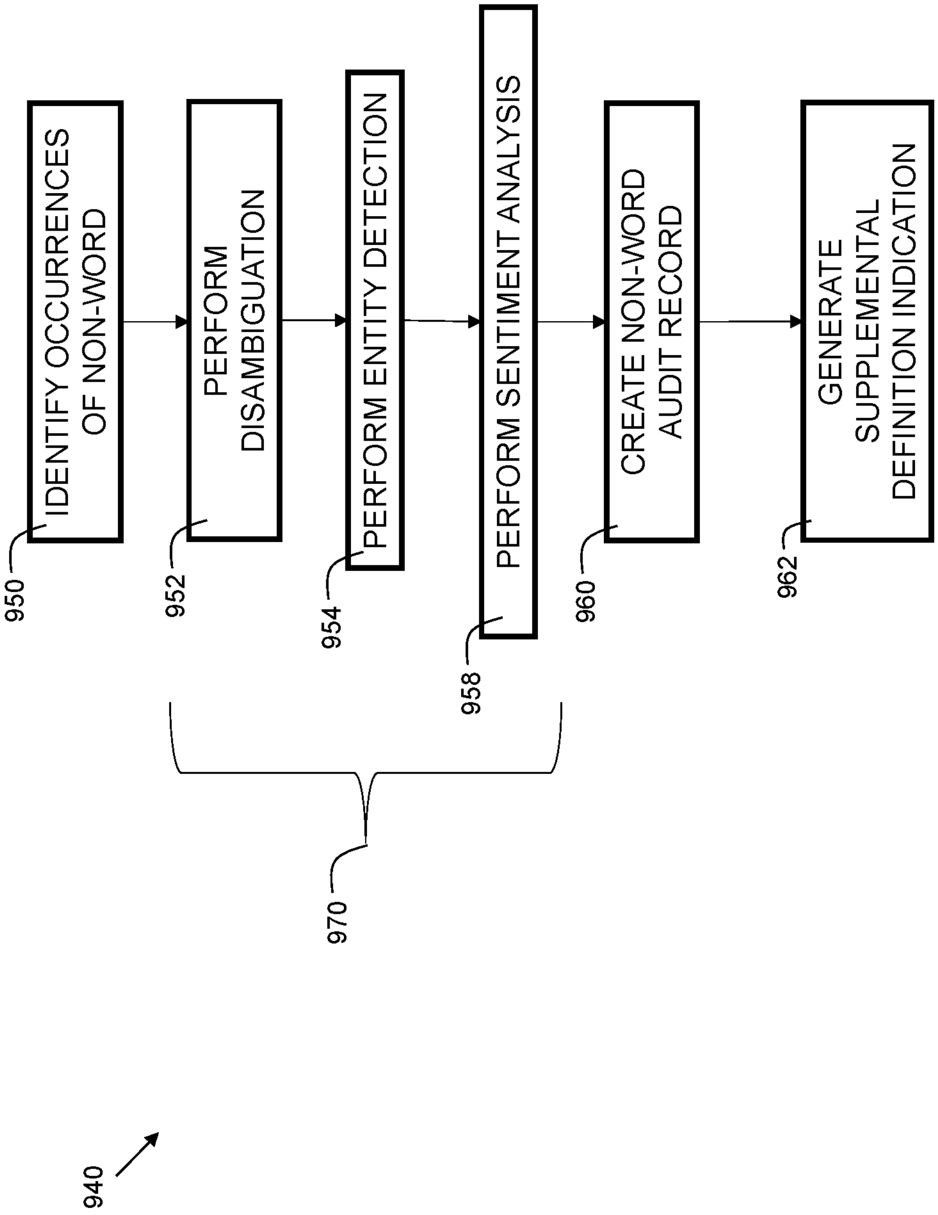
FIG. 10 is a flowchart indicating process steps for additional embodiments of the present invention.

FIG. 10 is a flowchart 940 indicating process steps for additional embodiments of the present invention. At 950, occurrences of a non-word are identified. This may be performed by using a lookup function in a dictionary stored within database 114. Sequences, which are alphanumeric patterns (combinations of letters and/or numbers), that are not in the database 114 may be deemed as non-words. Sequences that are in the database 114 may be deemed as words. The identification of non-words is useful in tracking the origins of new slang as it enters the lexicon of common language. At 970, one or more natural language processing processes are performed. These processes can include performing disambiguation at 952, performing entity detection at 954, and/or performing sentiment analysis at 958. In some embodiments, the processes indicated at 952, 954, and 958 may be performed in a different order, or one or more of the processes indicated at 952, 954, and 958 may be performed simultaneously. At 960, a non-word audit record is created, such as shown in FIG. 7. At 962, a supplemental definition indication is generated for the non-word.

Embodiments can include identifying a plurality of occurrences of a non-word in the digital content; and in response to the plurality of occurrences exceeding a predetermined number, performing a computerized natural language processing process to derive a meaning for the non-word. In embodiments, the natural language processing process comprises entity detection, sentiment analysis, and/or disambiguation.

Figure 11:
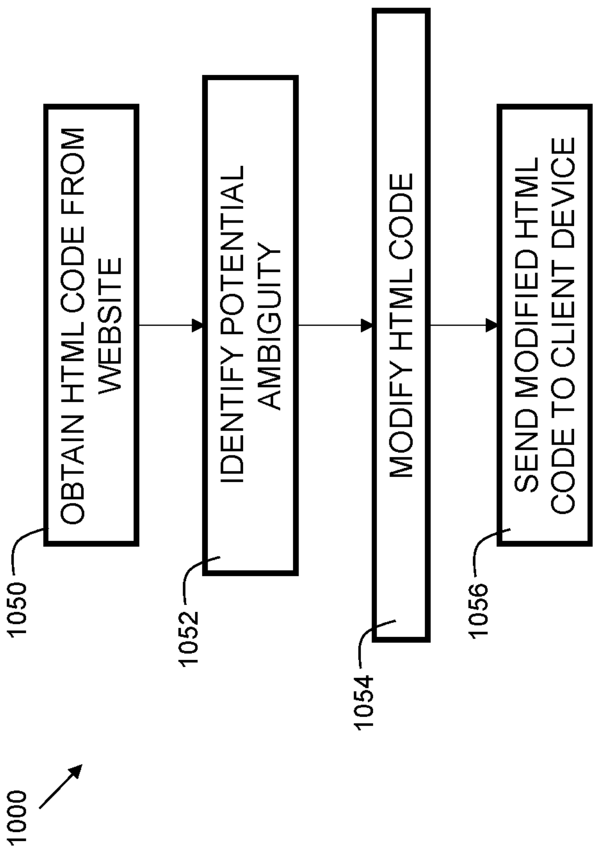
FIG. 11 is a flowchart indicating process steps for additional embodiments of the present invention.

FIG. 11 is a flowchart 1000 indicating process steps for additional embodiments of the present invention. At 1050, code is obtained from a website. In embodiments, the code is HTML code. In other embodiments, other types of markup languages may be used instead of, or in conjunction with, HTML code. The website can be a website such as indicated at 173 that contains digital content. At 1052, a potential ambiguity is identified. This can include identifying a word that has more than one meaning (homonym). At 1054, the code obtained at 1054 is modified to include a supplemental definition indication and one or more associated definitions. At 1056, the modified code is transmitted to a client device (e.g., 116 of FIG. 1). In embodiments, a web browser executes on the client device. In some embodiments, the web browser executes a plugin that communicates with the DCVAS 102 in order to obtain a supplemental definition indication and one or more associated definitions.

Figure 12:
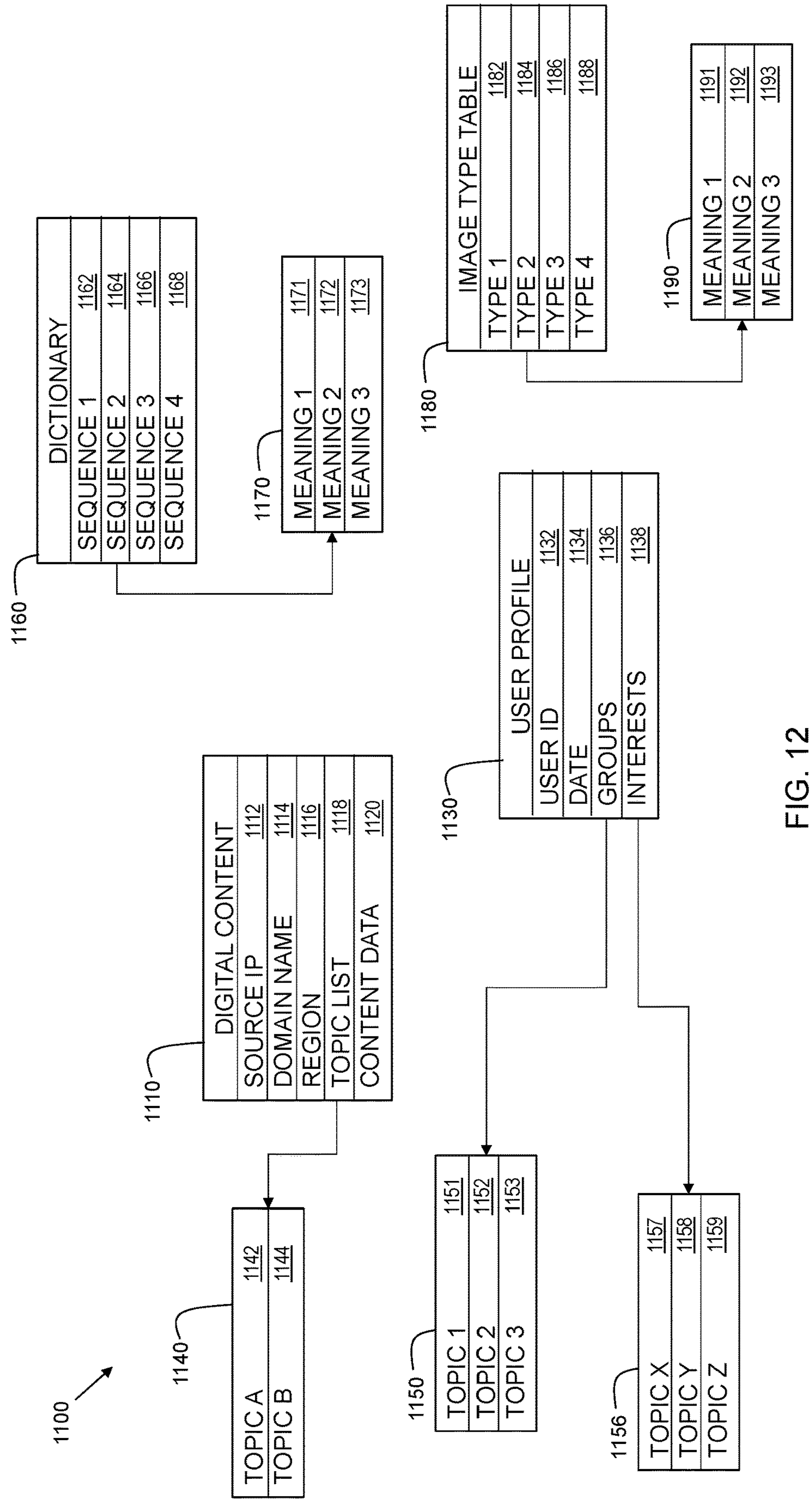
FIG. 12 shows an example of data structures used in accordance with embodiments of the present invention.

FIG. 12 shows an example of data structures 1100 used in accordance with embodiments of the present invention. The data structures can include a digital content data structure 1110. The digital content data structure 1110 can include metadata such as a source IP (Internet Protocol) address 1112, a domain name 1114, a geographical region 1116, and a topic list 1118. The topic list 1118 may reference a topic list data structure 1140. Topic list data structure 1140 contains two topics, indicated as topic A (1142) and topic B (1144). These topics are deemed to be topics pertaining to the content data 1120, based on computerized natural language processing, computerized image analysis, and/or analysis of the metadata. While two topics are shown in topic list data structure 1140, in practice, there can be more or fewer topics in topic list data structure 1140.

The data structures can include a user profile data structure 1130. The user profile data structure 1130 can include metadata such as a user identifier (ID) 1132, a date 1134, a group list 1136, and an interest list 1138. The group list 1136 may reference a topic list data structure 1150. Topic list data structure 1150 contains three topics, indicated as topic 1 (1151), topic 2 (1152) and topic 3 (1153). These topics are deemed to be topics pertaining to the groups 1136, based on computerized natural language processing, computerized image analysis, and/or analysis of the metadata. While three topics are shown in topic list data structure 1150, in practice, there can be more or fewer topics in topic list data structure 1150.

The interests list 1138 may reference a topic list data structure 1156. The interests may be provided by a user during creation and/or updating of a social media program to indicate his/her interests and hobbies. Topic list data structure 1156 contains three topics, indicated as topic X (1157), topic Y (1158), and topic Z (1159). These topics are deemed to be topics pertaining to the interests in interest list 1138, based on computerized natural language processing, computerized image analysis, and/or analysis of the metadata. While three topics are shown in topic list data structure 1156, in practice, there can be more or fewer topics in topic list data structure 1156.

In embodiments, identifying a familiarity category comprises obtaining data from a user profile. In embodiments, obtaining data from the user profile comprises obtaining group data. In embodiments, obtaining data from the user profile comprises obtaining group data from a social media system.

The data structures can include a dictionary 1160. The dictionary 1160 comprises a list of sequences of characters. The sequences can be ASCII, Unicode, UTF-8, or other suitable encoding. In the example, there are four sequences shown. Sequence 1 at 1162, sequence 2 at 1164, sequence 3 at 1166, and sequence 4 at 1168. While four sequences are shown in dictionary 1160, in practice, there can be more or fewer sequences in dictionary 1160. The sequences can represent known words of a language (e.g., English words, Spanish Words, etc.). The sequences can represent non-words such as slang, jargon, and the like. The sequences can represent compound emojis.

The data structures can include an image type table 1180. The image type table 1180 comprises a list of image classifications. These can be classifications provided by machine learning system 122 based on image classification from supervised and/or unsupervised learning. In image type table 1180, four types are shown: type 1 at 1182, type 2 at 1184, type 3 at 1186, and type 4 at 1188. While four types are shown in image type table 1180, in practice, there can be more or fewer image types in image type table 1180. Each type can reference a corresponding meaning list. In the example, type 2 (1184) references meaning table 1190, which contains three possible meanings, indicated as meaning 1 (1191), meaning 2 (1192), and meaning 3 (1193). While three meanings are shown in meaning table 1190, in practice, there can be more or fewer meanings in meaning table 1190. Furthermore, for clarity in FIG. 12, a meaning table is only illustrated for type 2 (1184). In practice, each type indicated in image type table 1180 may reference a corresponding meaning table similar to that indicated at 1190.

Figure 13:
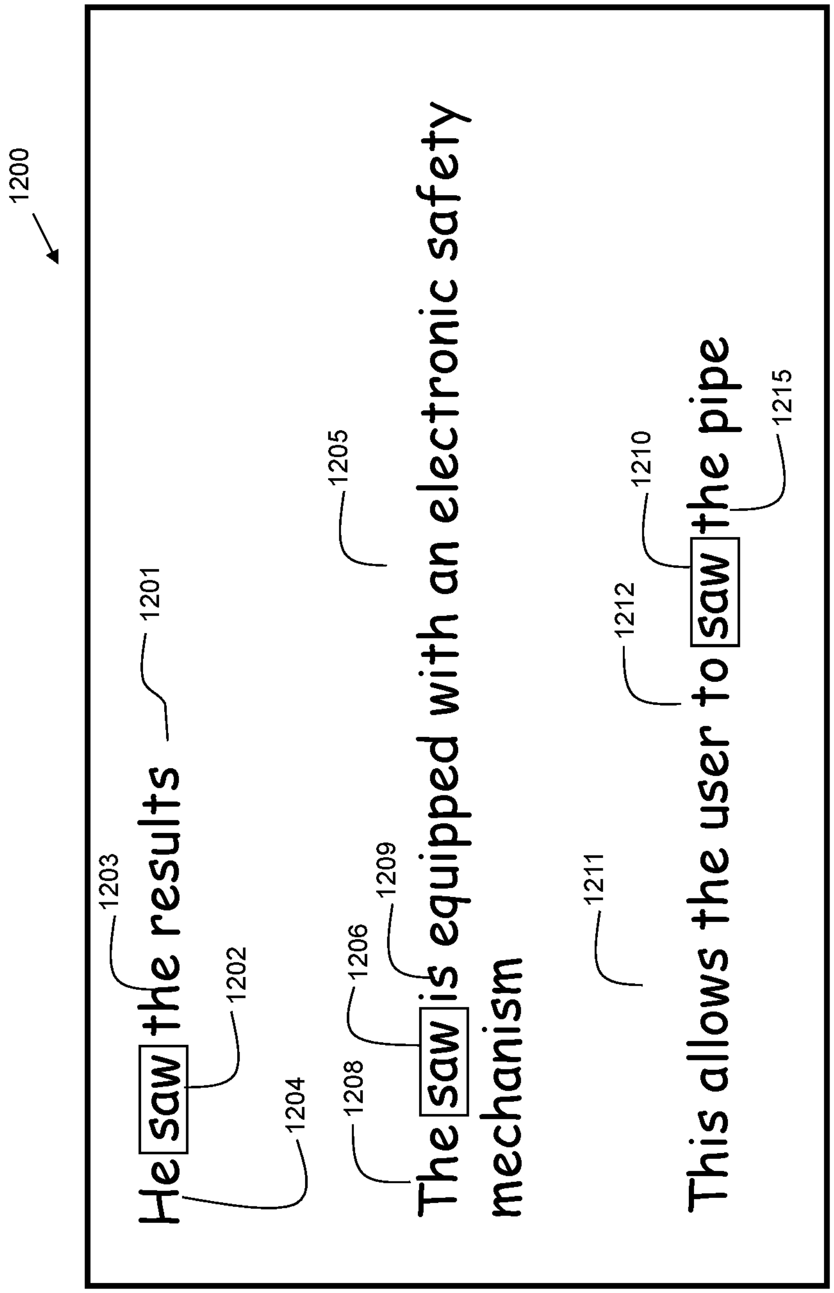
FIG. 13 shows examples of disambiguation.

FIG. 13 shows an example 1200 of disambiguation in accordance with embodiments of the present invention. In embodiments, the disambiguation process may be performed by DCVAS 102 and/or machine learning system 122. As part of digital content analysis, text may be tokenized into words and tagged with parts of speech. For some words, there can be more than one meaning and/or part of speech. FIG. 12 shows a disambiguation example with the word "saw." In phrase 1201, the word "saw" 1202 is a past tense verb. In embodiments, a machine learning natural language analysis module may identify the prior token 1204 to the word saw as a pronoun, and the following token 1203 as an article. In training a classifier, the pattern of pronoun-token-article may be associated with a verb, and thus the token is interpreted as a verb.

In phrase 1205, the word "saw" 1206 is a noun for a cutting tool. In embodiments, a machine learning natural language analysis module may identify the prior token 1208 to the word "saw" as an article, and the following token 1209 as a verb. In training a classifier, the pattern article-token-verb may be associated with a noun, and thus the token is interpreted as a noun.

In phrase 1211, the word "saw" 1210 is a verb pertaining to operating a cutting tool. In embodiments, a machine learning natural language analysis module may identify the prior token 1212 to the word "saw" as part of an infinitive form, and the following token 1215 as an article. In training a classifier, the pattern "to"-token-article may be associated with a verb, and thus the token is interpreted as an infinitive form of a verb for cutting, instead of a past tense verb as indicated at 1202. These classifiers and techniques for disambiguation are merely examples, and other classifiers and techniques are possible.

Figure 14A:
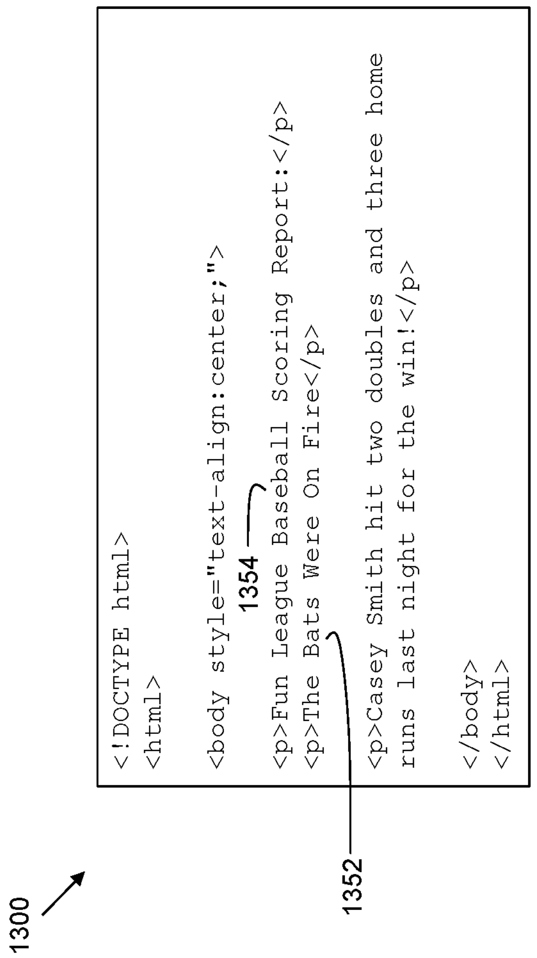
FIG. 14A shows an exemplary HTML code snip for rendering digital content.

FIG. 14A shows an exemplary HTML code snip 1300 for rendering digital content. HTML code snip 1300 includes text with the word "baseball" at 1354. This word may be used by the DCVAS 102 to classify the content as pertaining to the subject of baseball. HTML code snip 1300 further includes the word "bats" at 1352. The DCVAS 102 may identify the word "bats" as having multiple meanings. One such meaning may be a small flying mammal. Another meaning may be a stick used to hit a baseball.

FIG. 14B shows an exemplary modified HTML code snip 1320 based on the code snip of FIG. 14A, in accordance with embodiments of the present invention. In this example, the DCVAS 102 made the determination that the subject matter of the digital content pertains to baseball. The DCVAS created a modified HTML code snip that includes a tooltip segment 1322. The DCVAS 102 replaced the original code that displayed text 1352 in FIG. 14A with the code snip shown at 1324 that formats the text as a tool tip and includes a definition at 1327.

Figure 15A:
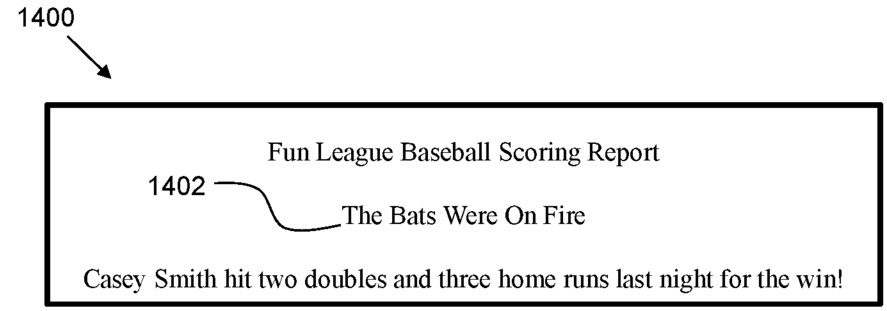
FIG. 15A shows an example rendering of the HTML code of FIG. 14A.
Figure 15B:
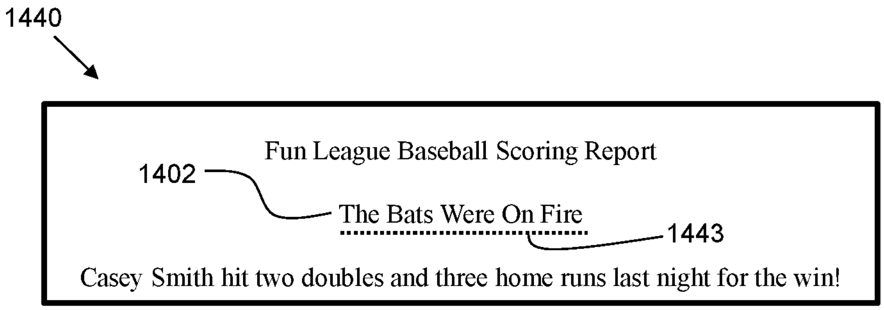
FIG. 15B shows an example rendering of the HTML code of FIG. 14B.
Figure 15C:
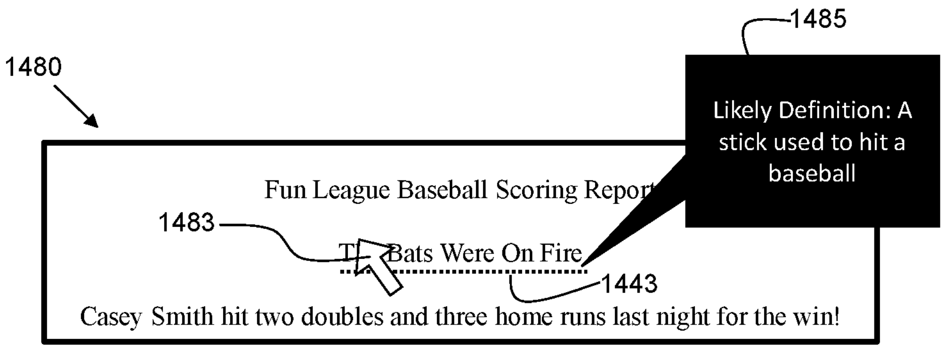
FIG. 15C shows an example rendering of the HTML code of FIG. 14B showing a supplemental definition in accordance with embodiments of the present invention.

FIG. 15A shows an example rendering 1400 of the HTML code of FIG. 14A. In this rendering, the text 1402 shows the string "The Bats Were On Fire" in a plain text format. FIG. 15B shows an example rendering 1440 of the HTML code of FIG. 14B. In this rendering, the text 1402 shows the string "The Bats Were On Fire" along with a supplemental definition indication 1443 in the form of an underline. FIG. 15C shows an example rendering 1480 of the HTML code of FIG. 14B showing a supplemental definition 1485 in accordance with embodiments of the present invention after placing a cursor 1483 over the supplemental definition indication 1443. The aforementioned process regarding HTML code modification is used in some embodiments. Other embodiments may utilize a different technique for generating supplemental definition indications.

Some embodiments may utilize a "Bag of Phrases" technique in which the DCVAS 102 identifies and extracts frequently occurring phrases on social media platforms and makes an assessment of how the phrases relate to each other using a co-occurrence model. A similar approach applies to emojis, where compound emojis may be treated as one "phrase."

In embodiments, thresholds for determining whether a phrase should be deemed a "new phrase" are based on frequency of occurrence. Determination of phrase relevance may be performed by comparing the occurrence with that of other phrases in a particular community of the Internet (i.e., a specific group or section within a social media system).

In embodiments, thresholds for how relevant a meaning is to a phrase are achieved by comparing this occurrence with that of other meanings of the same phrase in a similar community of the Internet (e.g., the same group within a social media system).

As an example, if "phrase 1" is found to have "meaning 1" 3 times and "phrase 1" is found to have "meaning 2" 200 times, the model defines "phrase 1" with "meaning 2" in that community of the Internet, since the number of occurrences of meaning 2 is orders of magnitude more than that for meaning 1.

In embodiments, content is ranked using a hierarchy that utilizes time decay where the most recent phrases and emoji sentences that social media users interact with are assumed to be the strongest driving factors. In some embodiments, weights are assigned to each of the other characteristics derived from the data such as demographics information, social media system, and the like. In embodiments, machine learning techniques are used to train a model and determine corresponding weights for a neural network.

As can now be appreciated, disclosed embodiments provide techniques to identify the in-context meanings of natural language in order to decipher the evolution or creation of new vocabulary words and create a more holistic user experience. Thus, disclosed embodiments improve the technical field of digital content comprehension. In embodiments, machine learning is used to identify sentiment of text, perform entity detection to determine topics of text, and/or perform image analysis on images used in digital content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
- identifying a familiarity category corresponding to a user;
- performing a computerized natural language processing process on digital content presented to the user to identify a topic of the digital content;
- computing a content unfamiliarity index for the digital content based on the topic and the familiarity category of the user;
- comparing the content unfamiliarity index to a predetermined threshold; determining, based on the comparing, that the content unfamiliarity index exceeds the predetermined threshold;
- identifying, in response to the determining, an unfamiliar token within the digital content that has a potentially unfamiliar meaning to the user based on the topic;
- in response to the determining, generating a supplemental definition indication for the token in the digital content;
- identifying, concurrently to identifying the unfamiliar token, a plurality of occurrences of a non-word in the digital content;
- creating a non-word audit record, wherein the non-word audit record includes metadata pertaining to a first-detected use of the non-word;
- computing a definition stability index for the non-word based on a definition history; and
- displaying, in response to an action by the user, the supplemental definition to the user.

2. The computer-implemented method of claim 1, wherein identifying a familiarity category comprises obtaining data from a user profile.

3. The computer-implemented method of claim 2, wherein obtaining data from the user profile comprises obtaining group data.

4. The computer-implemented method of claim 1, wherein identifying a familiarity category comprises performing an entity detection process on a post associated with the user.

5. The computer-implemented method of claim 1, wherein the digital content includes an emoji.

6. The computer-implemented method of claim 1, wherein the digital content includes a compound emoji.

7. The computer-implemented method of claim 1, wherein the digital content includes text.

8. The computer-implemented method of claim 1, wherein the digital content includes audio data.

9. The computer-implemented method of claim 1, wherein the digital content includes image data.

10. The computer implemented method of claim 1, further comprising:

in response to the plurality of occurrences exceeding a predetermined number, performing the computerized natural language processing process to derive a meaning for the non-word.

11. The computer-implemented method of claim 10, wherein the computerized natural language processing process comprises entity detection.

12. The computer-implemented method of claim 11, wherein the computerized natural language processing process further comprises sentiment analysis.

13. The computer-implemented method of claim 12, wherein the computerized natural language processing process further comprises disambiguation.

14. The computer-implemented method of claim 10, wherein the metadata includes an internet domain name.

15. The computer-implemented method of claim 10, wherein the metadata includes a group name.

16. The computer-implemented method of claim 10, wherein the non-word audit record further includes the definition history for the non-word.

17. An electronic computation device comprising:

a processor;

a memory coupled to the processor, the memory containing instructions, that when executed by the processor, cause the electronic computation device to:

identify a familiarity category corresponding to a user;

perform a computerized natural language processing process on digital content presented to the user to identify a topic of the digital content;

compute a content unfamiliarity index for the digital content based on the topic and the familiarity category of the user;

compare the content unfamiliarity index to a predetermined threshold;

determine, based on the comparing, that the content unfamiliarity index exceeds the predetermined threshold;

identify, in response to the determining, an unfamiliar token within the digital content that has a potentially unfamiliar meaning to the user based on the topic;

in response to the determining, generate a supplemental definition indication for the digital content;

identify a plurality of occurrences of a non-word in the digital content;

create a non-word audit record, wherein the non-word audit record includes metadata pertaining to a first-detected use of the non-word;

compute a definition stability index for the non-word based on a definition history; and display, in response to an action by the user, the supplemental definition to the user.

18. A computer program product for an electronic computation device comprising a computer readable storage medium having program instructions embodied therewith, the program instructions executable by a processor to cause the electronic computation device to:

identify a familiarity category corresponding to a user;

perform a computerized natural language processing process on digital content presented to the user to identify a topic of the digital content;

compute a content unfamiliarity index for the digital content based on the topic and the familiarity category of the user;

compare the content unfamiliarity index to a predetermined threshold; determine, based on the comparing, that the content unfamiliarity index exceeds the predetermined threshold;

identify, in response to the determining, an unfamiliar token within the digital content that has a potentially unfamiliar meaning to the user based on the topic;

in response to the determining, generate a supplemental definition indication for the digital content;

identify a plurality of occurrences of a non-word in the digital content;

create a non-word audit record, wherein the non-word audit record includes metadata pertaining to a first-detected use of the non-word;

compute a definition stability index for the non-word based on a definition history; and display, in response to an action by the user, the supplemental definition to the user.

* * * * *